Aug. 21, 1928.
C. E. PADILLA
1,681,645
LUBRICATOR
Filed Nov. 24, 1925
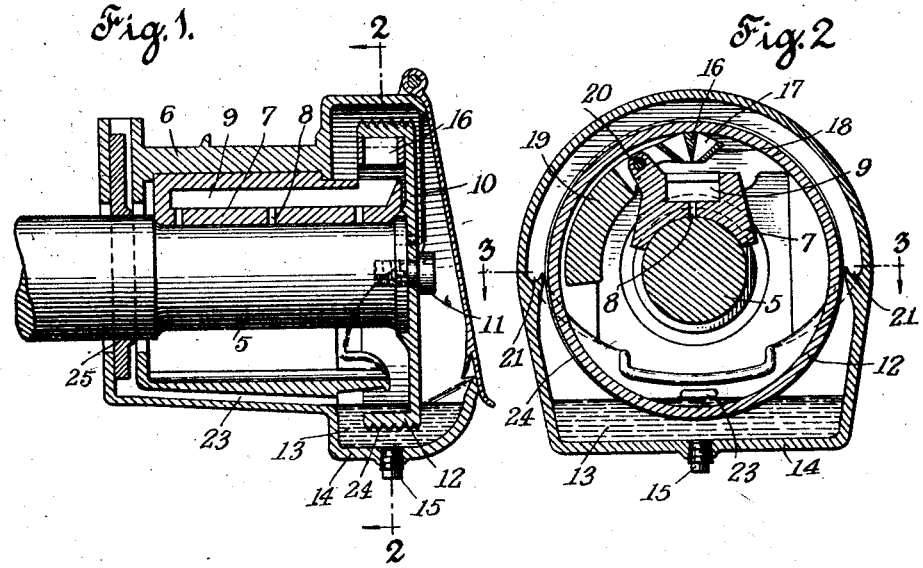
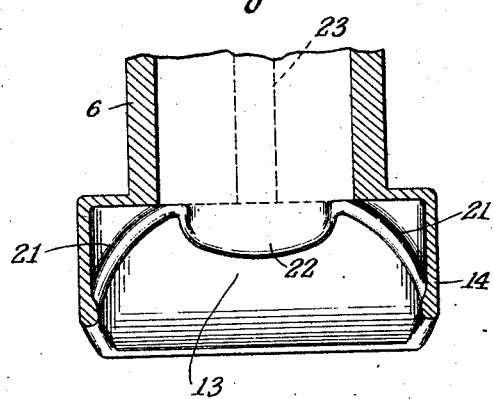
INVENTOR
Carlos E. Padilla
BY
Hervey Barber & McKee
ATTORNEY Patented Aug. 21, 1928.

1,681,645

UNITED STATES PATENT OFFICE.

CARLOS E. PADILLA, OF BOGOTA, COLOMBIA, SOUTH AMERICA.

LUBRICATOR.

Application filed November 24, 1925. Serial No. 71,115.

This invention relates to lubricators intended for use with any kind of car axle, shaft, or rotating device, the lubricant being actuated by the rotation thereof and substantially in proportion to the speed of the said rotation.

It is also in the nature of an improvement on the device disclosed and claimed in my copending application Serial No. 46,637, filed July 28, 1925, the principal improvement thereon consisting of a modified axle box provided with means for collecting the lubricant which is carried on the exterior surface of the flange on the ring and conveying it to the interior surface of the said ring from which it is transferred to the part to be lubricated.

I have also devised a new corrugated construction for the exterior surface of the said ring flange which I have found aids greatly in breaking up the lubricant carried thereon and thrown off centrifugally by the rotation of the disk and flange.

As is obvious, my device is very economical in lubricant consumption, there is practically no waste, and the lubrication is regulated by the speed at which the rotating member moves.

Other advantages and details are set forth in the following specification and shown in the drawings in which:—

Fig. 1 is a longitudinal section view.

Fig. 2 is a sectional view on line 2—2 of Fig. 1.

Fig. 3 is a sectional view on line 3—3 of Fig. 2.

In the said drawings the numeral 5 indicates a car axle and 6 is an axle box provided with a bearing 7 having a number of apertures 8 opening into the pocket 9 from which the lubricant is passed on to the axle 5.

On the said axle 5, a disk 10 is mounted and secured by the screw 11, the said disk having a ring or annular flange 12 provided with corrugations 24 which upon rotation, pass through and gather up on their surfaces the lubricant 13 from the enlarged portion 14 of the axle box 6. As is obvious, these corrugations 24 will materially aid in breaking up the lubricant and causing a wide dissemination thereof as the rotation proceeds.

I have discovered in actual practice, that at high speed the flange 12 moving through the lubricant 13 forms a depressed trough therein, so that the top level of the lubricant will fall and none will be carried by the interior surface of the ring flange 12 to the scraper 16 and removed thereby, so that it may pass through the passages 17 between the scraper and the guide walls 18. The numeral 15 indicates a drain plug of the usual type.

To obtain a constant but elastic contact between the scraper 16 and the inner surface of the ring flange 12 when operating, the said scraper is formed with a counter weighted end 19 fulcrumed at 20, whereby the scraper is always held in engagement with the ring flange but yields automatically in cases of necessity or when the bearing 7 wears from use.

In Fig 3, there is shown in detail my improved interior construction of the axle box. When the axle is rotating at high speed the top level of the lubricant 13 will fall and lubricant is conveyed only by the exterior surface. In order that this said lubricant may be conveyed to the interior surface of the ring flange 12 the axle box is formed with downwardly and inwardly extending troughs 21—21 into which flows the lubricant thrown off centrifugally from the exterior surface of the ring flange, a drip lip 22 being provided to conduct the said lubricant to the said interior surface of the ring flange. The numeral 23 indicates a return conduit through which any lubricant, prevented by the packing 25 around the axle from passing to the exterior of the box, may flow back to the main body 13.

I claim:—

1. In a lubricator, the combination of the following elements; a disk provided with a ring flange; a scraping member pivotally mounted, and provided at one end with means for removing lubricant from the interior surface of the said ring flange, and at the other end with counter-balancing means adapted to hold the scraping end in contact with the said ring flange; means for conducting the removed lubricant to a desired point; means adapted to convey lubricant discharged from the exterior surface of the said ring flange to the inner surface of the said flange, and comprising downwardly and inwardly extending troughs adjacent the said exterior surface of the ring flange; and a drip lip mounted above the bottom section of the said interior surface of the ring flange.

2. In a lubricator adapted to be mounted in an axle box the combination of the following elements; a disk member adapted to be mounted on and to rotate with the axle; a ring flange provided with exterior corrugations on the said disk; means adapted to remove lubricant from the interior surface of the said ring flange and comprising a scraper pivotally mounted on the axle bearing and provided with counterbalancing means adapted to hold the scraping end of the lubricant remover in contact with the said ring flange; means for conducting the removed lubricant to a desired point; means adapted to convey lubricant discharged from the corrugated exterior surface of the said ring flange to the inner surface of the said flange, and comprising downwardly and inwardly extending troughs on the inner walls of the axle box and adjacent the said exterior surface of the ring flange; and a drip lip mounted above the bottom section of the interior surface of the ring flange.

3. In a lubricator adapted to be mounted on a rotatable shaft the combination of the following elements; a disk member provided with a corrugated ring flange; a lubricant receptacle located beneath the said shaft whereby the said ring flange in its rotations will travel through the lubricant in the said receptacle; means for removing lubricant from the interior surface of the said ring flange and comprising a scraper pivotally mounted on the axle bearing and provided with counterbalancing means adapted to hold the scraping end of the lubricant remover in contact with the said ring flange; means for conducting the removed lubricant to a desired point; means adapted to convey lubricant discharged from the corrugated exterior surface of the said ring flange to the inner surface of the said flange, and comprising downwardly and inwardly extending troughs on the inner walls of the axle box and adjacent the said exterior surface of the ring flange; and a drip lip mounted above the bottom section of the interior surface of the ring flange.

4. In a lubricator adapted to be mounted on a rotatable shaft the combination of the following elements; a disk member provided with a corrugated ring flange; a lubricant receptacle located beneath the said shaft whereby the said ring flange in its rotations will travel through the lubricant in the said receptacle; means for removing lubricant from the interior surface of the said ring flange and comprising a scraper pivotally mounted on the axle bearing and provided with counterbalancing means adapted to hold the scraping end of the lubricant remover in contact with the said ring flange; means for conducting the removed lubricant to a desired point; means adapted to convey lubricant discharged from the corrugated exterior surface of the said ring flange to the inner surface of the said flange, and comprising downwardly and inwardly extending troughs on the inner walls of the axle box and adjacent the said exterior surface of the ring flange; and a drip lip mounted above the bottom section of the interior surface of the ring flange.

In testimony whereof I have hereunto affixed my signature.

CARLOS E. PADILLA.